March 11, 1969  C. E. BRICKER  3,432,009
PARKING ATTACHMENT FOR DISK BRAKE
Filed Jan. 9, 1967

INVENTOR.
CARL E. BRICKER
BY
Oldham & Oldham
ATTORNEY

United States Patent Office 3,432,009
Patented Mar. 11, 1969

3,432,009
PARKING ATTACHMENT FOR DISK BRAKE
Carl E. Bricker, Stow, Ohio, assignor to The Goodyear Tire & Rubber Company, Akron, Ohio, a corporation of Ohio
Filed Jan. 9, 1967, Ser. No. 607,973
U.S. Cl. 188—106                     4 Claims
Int. Cl. F16d 65/14, 55/00; B60t 13/04

ABSTRACT OF THE DISCLOSURE

A combined caliper type disk brake and parking brake actuated by a piston which is operated either by hydraulic pressure or by mechanical pressure from a shaft threaded through the housing of a cylinder which contains the piston. The shaft is rotated by a lever attached to shaft end which projects from the cylinder housing. Because the shaft is threaded through the housing, rotation of the shaft will cause it to move axially in the cylinder and force the piston to apply braking pressure against the brake disk.

---

This invention relates to a mechanical parking brake attachment for a conventional disk brake.

Objects of the invention

It is an object of this invention to provide a disk brake with a mechanically actuated parking brake attachment which requires only a small force to move the control lever but which exerts a much greater braking force on the brake disk.

Another object of the invention is to provide a parking brake attachment which has a minimum number of moving parts and is easy to install and durable in construction.

A further object of the invention is to provide a parking brake attachment which can be easily and mechanically actuated for association with a disk brake having one or more pressure application cylinders, but which has a normal released position permitting normal hydraulic operation of the disk brake.

A further object of the invention is to provide a parking brake attachment for a disk brake which utilizes the mechanical advantage of a screw to actuate the piston mechanically for gripping the brake disk in a parking position.

Description of the drawing

For a better understanding of the invention reference should be had to the enclosed drawings wherein.

Description of the preferred embodiments

Figure 1:
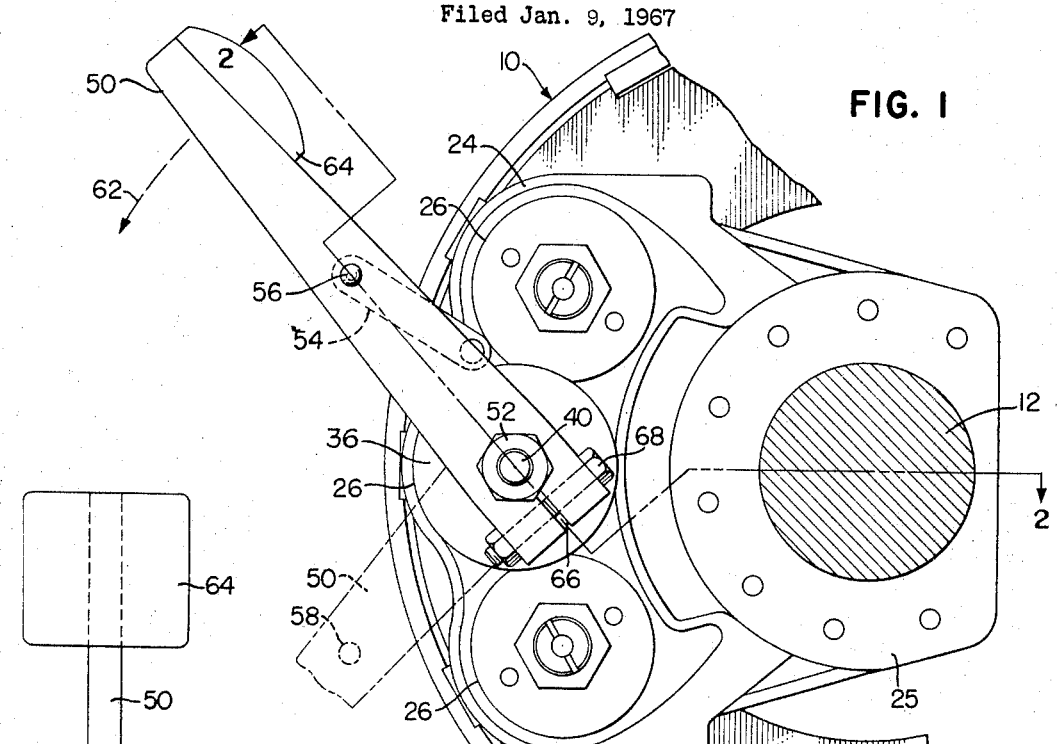
FIG. 1 is a side elevation of a disk brake incorporating the parking attachment features of the invention.

With reference to the form of the invention illustrated in the drawings, the numeral 10 indicates generally a disk brake which is used in conjunction with a stationary axle 12 on which is rotatably mounted a wheel 14 by a bearing 16. The wheel 14 carries in rotatable relationship therewith a brake disk 18 which is adapted to slide axially with respect to the wheel 14 on a plurality of driving keys 20, as best seen in FIG. 2.

The disk brake 10 has a torque flange or housing 24 bolted in fixed relationship to a flange 25 carried by the axle 12. The housing 24 defines a plurality of cylinders 26 in which slidable pistons 28 are received. Again, as best seen in FIG. 2, each of the pistons 28 carries a block 30 of friction material which is adapted to engage one side of the brake disk 18 which is positioned adjacent thereto. In substantially opposed relationship to friction block 30 a second block 32 is removably carried by the housing 24 to engage the opposite side of the brake disk 18, so that upon hydraulic actuation of piston 28 the friction blocks 30 and 32 pinch or grip brake disk 18 thereby slowing down or stopping the rotation of the brake disk 18 and the wheel 14. Each piston 28 has a rubber O-sealing ring 34 around its periphery to prevent leakage of hydraulic fluid from the cylinder 26.

Figure 2:
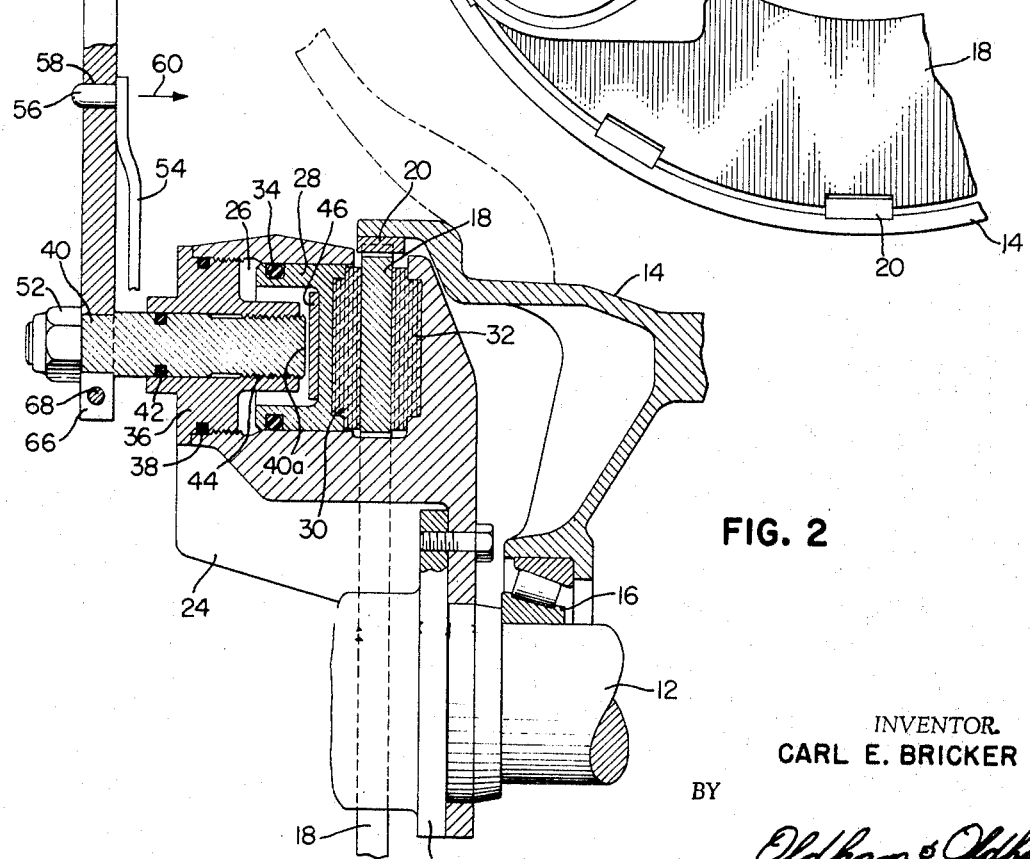
FIG. 2 is a vertical cross sectional view, partially broken away, of the brake of FIG. 1 taken on line 2—2 thereof.

The essence of the invention is incorporated into the central cylinder piston arrangement of the disk brake shown in FIG. 1, and it is best understood with reference to FIG. 2. Instead of having a closed back plate to the cylinder 26, a removable plug 36 is threadably secured thereto. An O-sealing ring 38 around the periphery of the plug 36 insures there will not be any leakage of hydraulic fluid upon actuation of piston 28. The plug 36 has a hole or bore therethrough which threadably receives a shaft 40, which also has an O-sealing ring 42 associated therewith to provide a seal between the shaft 40 and plug 36 so that no leakage of hydraulic fluid can occur. The shaft 40 is threaded with respect to plug 36 along an area indicated by numeral 44, and the end of the shaft 40a is adapted to engage a pressure plate 46 carried on the internal boss of the piston 28. Thus, with shaft 40 being axially aligned with respect to the piston 28, it can be seen that rotation of shaft 40 in the proper direction according to the threaded arrangement causes its end 40a to bear against plate 46 to mechanically move the friction block 30 axially against the brake disk 18 thereby gripping the disk between the friction blocks 30 and 32. In the practical construction of the invention, the threads 44 are of sufficient pitch so that approximately a 90° rotation of shaft 40 with normal friction block clearance from brake disk 18 will cause sufficient axial travel of the piston 28 to provide an extremely tight gripping of the brake disk and a reliable parking brake action.

To rotate the shaft 40, a long handle or lever 50 is fastened by a suitable locking nut 52 to the end thereof which extends from plug 36. The lever 50 extends radially from the shaft 40 and is positioned with respect to shaft 40 so that the free end thereof is above the connected end, as best indicated in FIG. 1 when the parking brake is deactivated. The rotation of the handle or lever 50 to the chain dotted line position below the connected end will then actuate the parking attachment. The lever 50 is normally held in this upward position by a spring metal latch 54 which has one end attached to the housing 24 and has a pin 56 on the other end thereof extending into a small hole 58 in the lever 50. In order to release the lever 50, the spring metal latch 54 must be pulled outwardly in a direction indicated by arrow 60 which then allows the lever 50 to move in the direction indicated by arrow 62 towards the chain dotted line position. Such release of the latch 54 may be effected by any suitable means or it may be manually released. Normally, the force of gravity will cause the lever 50 to pivot in the direction of arrow 62, and hence to assist in this action, a lump weight 64 is mounted at the free end of the lever 50.

Thus, the invention contemplates that in most instances, it will take nothing more than release of spring latch 54 to actuate the parking brake as the falling of weight 64 in effect actuates the brake because of the mechanical advantage achieved by the screw or threaded relationship of shaft 40 to the plug 36. In order to further assist such braking, however, one may also push the lever manually to a securely locked position. The lever 50 may also be operated as a foot pedal by stepping on the extended end thereas to apply the parking brake.

To prevent slippage of the lever 50 around the shaft 40, the attached end of the lever has a hole therein to receive the shaft and is split by a slot 66 which permits the lever 50 to be clamped on the shaft 40 by tightening a bolt 68. The bolt 68 is tightened sufficiently to cause the lever 50 and the shaft 40 to rotate as an integral unit under normal operating conditions. However, once the parking brake is engaged, if undue force is applied on the lever 50, it will slip sufficiently on the shaft 40 to prevent damage to the internal parts of the brake.

As wear of the friction blocks 30 and 32 occurs, it may be necessary to adjust the relationship of lever 50 to shaft 40, and this is very simply achieved by loosening nut 52 and bolt 68, adjusting the axial position of the shaft 40 to get proper clearance, relocating the lever 50 at the desired position relative to the shaft 40 and then again locking the lever 50 in position by tightening nut 52 and bolt 68.

Thus, it can be seen, that the objects of the invention have been achieved by utilizing a shaft threadably received through the housing with proper hydraulic seals relative thereto whereby rotation of the shaft by a long lever utilizes the mechanical advantage achieved in a screw relationship to impart a parking brake action to a conventional disk brake which is highly effective, easy to operate, and extremely reliable. Although this invention has been shown used in a single disk brake it can also be used in a multiple disk brake.

While in accordance with the patent statues, only one best known embodiment of the invention has been illustrated and described in detail, it is to be understood that the invention is not limited thereto or thereby, but that the inventive scope is defined in the appended claims.

What is claimed is:

1. In a brake for use with a wheel rotatably mounted on a fixed axis, the combination of at least one brake disc carried by the wheel, a housing mounted in fixed relation to the axle and extending along each side of the brake disc, at least one piston carried by the housing, means to hydraulically actuate the piston, a first friction means carried by the piston and adapted to engage one side of the brake disc, a second friction means carried by the housing in substantially opposed relation to said first friction means and adapted to engage the brake disc on the opposite side thereof from the first friction means, which brake is characterized by including a removable plug threadably received in and extending through the housing so one end thereof is positioned adjacent the piston, a shaft threadably and rotatably positioned in and extending through the plug to engage the piston, a pressure plate mounted to the piston to be engaged by the shaft, and lever means to rotate the shaft to cause axial movement of the shaft and the piston to thereby mechanically cause the friction means to grip the brake disc which includes a weight mounted on the end of the lever means so that the force of gravity tends to move the lever and rotate the shaft to the actuating position.

2. A brake according to claim 1 which includes means to selectively hold the lever in position whereby the parking brake is not activated, but whereby release of said holding means allows the lever to fall by gravity to mechanically cause the friction means to grip the brake disc.

3. A brake according to claim 1 where the lever is mounted to the shaft by a split slot whereby the lever will slip on the shaft to prevent damage to the internal parts of the brake if excessive forces are applied thereto.

4. A brake according to claim 3 whereby hydraulic seals are provided between the piston and the housing, the plug in the housing, and the shaft and the plug.

References Cited

UNITED STATES PATENTS

| 2,495,979 | 1/1950 | McSparran | 188—174 |
| 2,946,408 | 7/1960 | Peras | 188—106 |
| 2,963,116 | 12/1960 | Peras | 188—106 |

DUANE A. REGER, *Primary Examiner.*

U.S. Cl. X.R.

188—73, 174